No. 863,136. PATENTED AUG. 13, 1907.
N. C. BASSETT.
VALVE.
APPLICATION FILED MAR. 27, 1907.
2 SHEETS—SHEET 1.
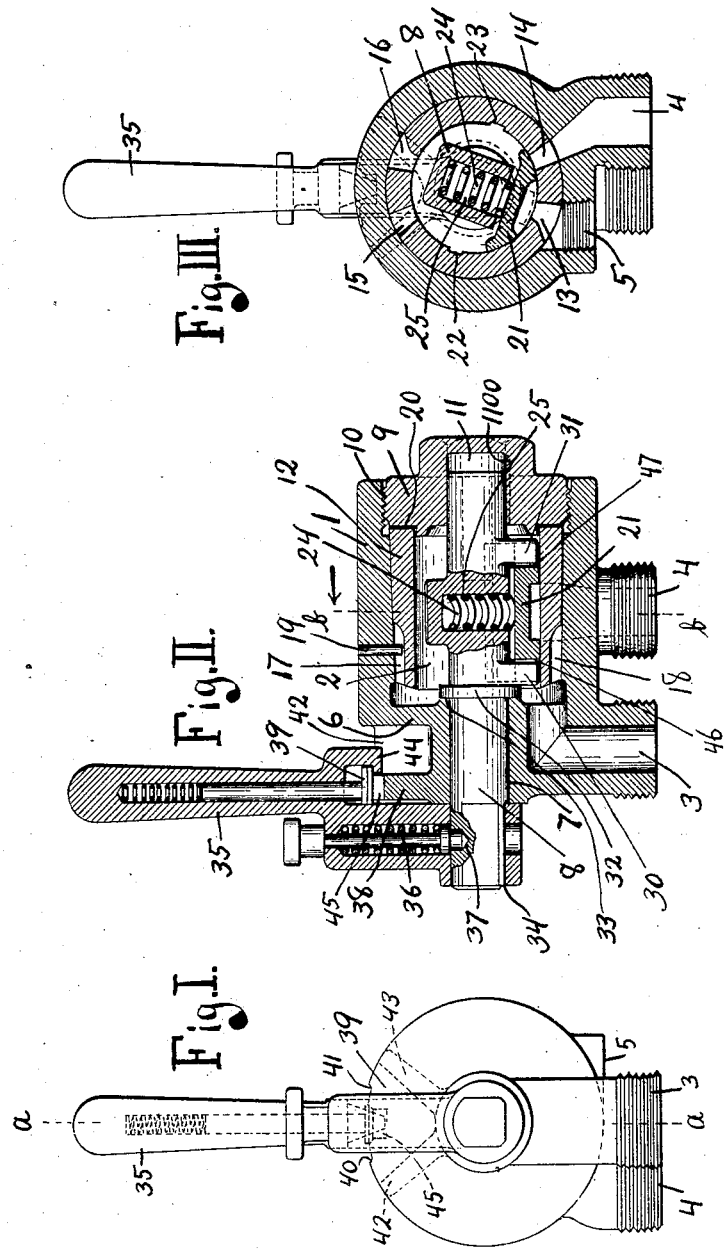
WITNESSES:
Frank E. Dennett
Ella Brickell
N. C. Bassett INVENTOR
BY
G. J. DeWein ATTORNEY.
THE NORRIS PETERS CO., WASHINGTON, D. C.

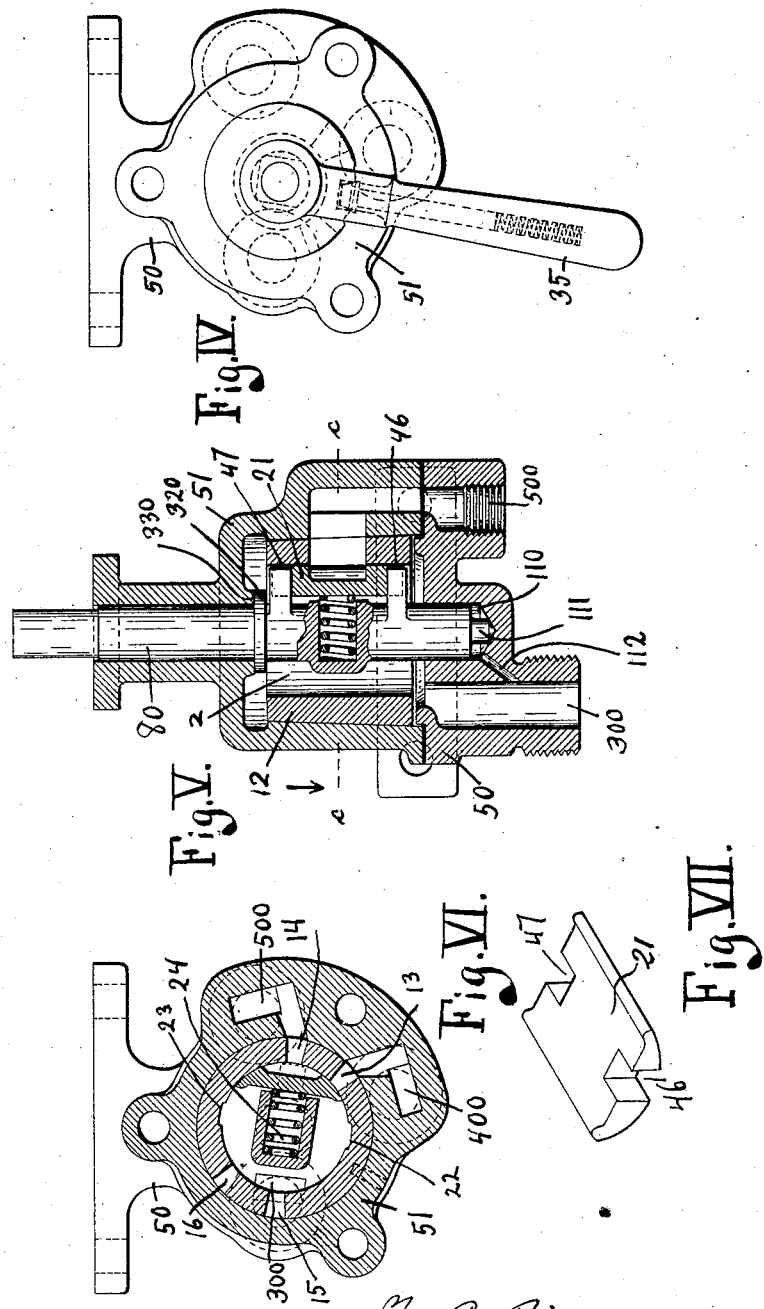

UNITED STATES PATENT OFFICE.

NORMAN C. BASSETT, OF MILWAUKEE, WISCONSIN, ASSIGNOR TO ALLIS-CHALMERS COMPANY, OF MILWAUKEE, WISCONSIN, A CORPORATION OF NEW JERSEY.

VALVE.

No. 863,136.      Specification of Letters Patent.      Patented Aug. 13, 1907.

Application filed March 27, 1907. Serial No. 364,811.

*To all whom it may concern:*

Be it known that I, NORMAN C. BASSETT, a citizen of the United States, residing at Milwaukee, in the county of Milwaukee and State of Wisconsin, have invented a certain new and useful Valve, of which the following is a specification.

This invention relates to valves for controlling the flow of a fluid through a pipe or conduit, and while capable of use for controlling any fluid and under any desirable conditions, it is especially adapted to control the flow of a fluid under pressure to or from a motor in which the fluid is utilized to do some desirable work, the specific embodiment of the invention disclosed by this application being a valve adapted to admit fluid to a motor from a source of supply or to permit it to be exhausted from said motor while guarding against leakage of the fluid from the source of supply directly to the exhaust.

The specific structural embodiment of the invention as disclosed by this specification is an engineer's valve adapted to supply air under pressure to the brake cylinders of a car or train and to permit the air under pressure in said brake cylinders to be exhausted therefrom into the atmosphere.

On the drawings which accompany this specification and form a part thereof and on which the same reference characters are used to designate the same elements wherever they may appear in each of the several figures,—Figure 1 shows an end elevation of the valve. Fig. 2 shows a longitudinal cross section of the valve taken on the line a—a of Fig. 1. Fig. 3 shows a transverse vertical cross section of the valve taken on the line b—b of Fig. 2 looking in the direction indicated by the arrow. Fig. 4 represents a plan view of a modified type of the valve. Fig. 5 represents a vertical section through the type shown by Fig. 4. Fig. 6 represents a horizontal section taken on the line c—c of Fig. 5 looking in the direction indicated by the arrow. Fig. 7 is a perspective of a detail.

Referring to the drawings,—the numeral 1 designates a valve shell or casing, which is preferably of an approximately cylindrical contour in cross section, provided with an interior cylindrical cavity 2, with which cavity communicates respectively the pressure thoroughfare 3, the brake thoroughfare 4, and the exhaust thoroughfare 5, the pressure thoroughfare 3 preferably communicating with one end of the cylindrical cavity 2, as clearly shown by Fig. 2 of the drawings. One end of the shell is substantially closed, as designated by 6, and is preferably formed integral with the body portion of the shell 1, a passageway 7 being provided through this end for the passage of the valve spindle 8. The other end of the cylindrical cavity 2 is open, but is adapted to be closed by the removable block 9 which is in screw-threaded engagement with the shell 1, as designated by 10. This block 9 is preferably provided with a cylindrical cavity 11 in axial alinement with the passage 7, for restraining any possible displacement of the valve spindle 8, and the air under pressure may be admitted within said cavity behind valve spindle 8 through the duct 1100 to force said spindle outwardly to make a tight joint, as will be described.

Located within the cylindrical cavity of the shell 1 is the bushing 12 provided with ports 13, 14, 15 and 16, said bushing being also provided with the slots 17 and 18, either of which is adapted to register respectively with the pin 19 carried by the shell 1, by which means the several ports in the bushing may be accurately and readily placed in alinement with the brake and exhaust thoroughfares in the shell or casing 1. This bushing, as shown by Figs. 2 and 5 of the drawings, is in the form substantially of a hollow cylinder and the pressure thoroughfare communicates with the interior thereof. Suitable packing 20 may be provided between the block 9 and bushing 12 to prevent the escape of fluid therebetween.

The bushing 12 is reversible, so that either the ports 13 and 14 may be placed in communication with the exhaust and brake thoroughfares respectively, or the ports 16 and 15 may be placed in communication with said throoughfares, a valve member 21 being adapted to slide on the interior surface of said bushing to control the flow of air through said valve, and the bushing is made reversible so that when the valve member 21 has worn a side of the bushing excessively, the bushing can be turned over to present a new surface to the valve, thereby prolonging the usefulness of a single bushing.

The bushing is provided with slots extending lengthwise thereof, as designated by 22 and 23, which slots are located at the extremities of the travel of the valve member 21, said valve member 21 projecting a trifle over said slots at its limit of movement in order to insure a uniform wearing of the valve seat or part of the bushing upon which the valve member 21 slides. This valve member 21 is a slide valve of that general type known as a D-valve and is retained upon its seat against the bushing 12 by the air pressure which exists within the chamber 2 of the shell 1, and also by a spiral spring 24 which forces it to its seat, one end of the spiral spring abutting against the valve spindle 8, which is provided with a recess 25 to receive said spring, thereby making a more compact structure.

The valve spindle 8 is provided with lugs 30 and 31 between which the valve member 21 is received, and it is also provided with the collar 32 which is adapted to seat against a face 33 formed upon the head 6, in order to provide for a fluid tight joint between the valve spindle 8 and the casing 1.

A part of the valve spindle which extends out from the valve casing 1 through the passage 7 is squared or otherwise shaped at 34 to receive a suitable operating handle 35, which handle is provided with a spring pressed pin 36 adapted to seat in a cavity 37 in the spindle 8, in order to prevent accidental displacement of said handle.

The casing 1 is extended, as at 38, to form a quadrant with which a spring pressed pawl 39 may engage to retain the valve member 21 in a predetermined position or to indicate the position of said valve member 21, as the case may be, this quadrant 39 being provided with customary forms of notches 40 and 41, stops 42 and 43, being also provided.

The numeral 44 designates a projection upon the handle which is designed to engage behind the quadrant 38, a notch 45 being provided through which said projection is adapted to pass when the handle is removed from or applied to the valve stem 8.

The lugs 30 and 31 on the valve spindle 8, engage within slots 46 and 47 in the valve member 21, and serve to positively move said valve member 21 upon its seat on the bushing 12, said valve member being retained against its seat by the spring 24 and the air pressure within the cavity of the casing, as before described.

The operation of the valve is as follows: When the valve member 21 is in the lap position, as clearly shown by Fig. 3 of the drawings, the handle 35 may be placed on the valve stem 8 or removed therefrom. With the handle on the stem and in the position as shown by Fig. 1 of the drawings, a movement of the handle to the right will place the brake thoroughfare in communication with the exhaust, while a movement of said handle in the reverse direction will place the brake thoroughfare in communication with the interior of the shell or casing 1, which is supplied with air under pressure by means of the thoroughfare 3. The handle may be thrown either to the right or to the left until stopped either by the notch 40 or stop 42, or by the notch 41 or stop 43, as the case may be, in a manner similar to valves of this general nature which are in extensive use.

The modified structure of valve shown by Figs. 4, 5 and 6, is in all essential particulars the same as that already described in connection with the preferred form of construction. This valve is intended to be used with the spindle 80 in a vertical position, and the only important difference in structural details consists in forming the valve with a base 50 to which is secured the bonnet 51, the base being provided with the pressure thoroughfare 300, the brake thoroughfare 400, and the exhaust thoroughfare 500; the base being provided with a cylindrical bore 110 to receive the end of the valve spindle 8, and said spindle being preferably reduced in diameter, as indicated at 111, a passage 112 being provided to afford communication between said cylindrical bore and the pressure thoroughfare 300, whereby the pressure of the air will retain the collar 320 on the valve stem against the face 330 on the bonnet.

The general structure of the two forms of valves being otherwise similar, the foregoing description of the modified form is deemed sufficient to render its structure and function entirely clear.

What I claim is,—

1. The combination with a valve casing adapted to contain a fluid under pressure and provided with a port, of a valve member for controlling said port, a spindle extended into said casing and provided with two laterally extended lugs between which said valve member is located and by which said valve member is engaged, and a spring compressed between said spindle and said valve member.

2. The combination with a valve casing adapted to contain a fluid under pressure and provided with a port, of a valve member for controlling said port, a spindle extended into said casing and engaged with said valve member, and a spring compressed between said spindle and said valve member, said spindle being provided with a collar adapted to bear against the casing and having its end within the casing exposed to the fluid under pressure therein.

3. The combination with a valve casing adapted to contain a fluid under pressure and provided with a port, of a hollow bushing provided with two ports therethrough, either of which ports is adapted to be placed in register with the port in the casing, a valve member for controlling the flow of fluid through the ports in register, a spindle extended into said casing and engaged with said valve member, and a spring compressed between said spindle and said valve member.

4. The combination with a valve casing adapted to contain a fluid under pressure and provided with a port, of a hollow bushing provided with two ports therethrough, either of which ports is adapted to be placed in register with the port in the casing, a valve member for controlling the flow of fluid through the ports in register, a spindle extended into said casing and engaged with said valve member, and a spring compressed between said spindle and said valve member, said spindle being provided with a collar adapted to bear against the casing and having its end within the casing exposed to the fluid under pressure therein.

5. The combination with a valve casing adapted to contain a fluid under pressure and provided with a port, of a valve member for controlling said port, said valve member being provided with slots, a spindle extended into said casing and provided with two laterally extended lugs which engage with said valve member within said slots, and a spring compressed between said spindle and said valve member.

In testimony whereof, I affix my signature in the presence of two witnesses.

NORMAN C. BASSETT.

Witnesses:
 FRANK E. DENNETT,
 ELLA BRICKELL.